United States Patent [19]
Golze et al.

[11] 3,779,592
[45] Dec. 18, 1973

[54] HIGH STRENGTH VEHICLE BUMPER

[75] Inventors: Richard R. Golze, Bloomfield Hills; Richard F. Kienle, Bloomfield Twp., both of Mich.

[73] Assignee: Rockwell International Corporation, Pittsburgh, Pa.

[22] Filed: June 1, 1972

[21] Appl. No.: 258,761

[52] U.S. Cl. .................................. 293/98, 293/70
[51] Int. Cl. ............................................. B60r 19/00
[58] Field of Search ..................... 293/70, 71 R, 88, 293/98

[56] References Cited
UNITED STATES PATENTS

| 2,182,484 | 12/1939 | Mills | 293/88 |
| 2,203,985 | 6/1940 | Dorman | 293/71 R |
| 2,531,967 | 11/1950 | Bishop | 293/71 R |
| 3,212,941 | 10/1965 | O'Brien | 293/98 |

FOREIGN PATENTS OR APPLICATIONS
| 697,023 | 9/1953 | Great Britain | 293/71 R |

Primary Examiner—Gerald M. Forlenza
Assistant Examiner—Robert Saifer
Attorney—John R. Bronaugh et al.

[57] ABSTRACT

A high strength vehicle bumper resistant to damage caused by impact forces and including a pair of structural members formed from dissimilar metallic materials. Means join the structural members together into a composite member while electrically insulating the dissimilar materials from one another. In a first embodiment of the invention said means comprises an adhesive layer located between the dissimilar materials. In a second embodiment of the invention, said means comprise metal fastener means joining the structural members and shielding means separating and electrically insulating said materials from said fastener means and from each other.

6 Claims, 3 Drawing Figures

HIGH STRENGTH VEHICLE BUMPER

BACKGROUND OF THE INVENTION

In order to provide a vehicle bumper having relatively high resistance to deformation and other damage due to impact forces as would occur during a vehicle collision, it is well known to form the external bumper member so that it has a generally rectangular or box-shaped cross section. The desirability of such a bumper on motor vehicles, especially in combination with energy absorbing devices connecting the bumper to the vehicle frame, greatly has increased with the inclusion in vehicle design parameters of schemes for eliminating or greatly reducing damages to the vehicle due to low speed collisions. A disadvantage of such bumpers, however, is that the structure necessary to provide the box-shaped cross section greatly adds to the weight of the vehicle. This disadvantage is compounded when energy absorbing devices are used to mount the bumper as energy absorbing devices typically are quite heavy in weight.

It is an object of this invention to provide a high strength, impact deformation resistant vehicle bumper having a box-shaped cross section that avoids the disadvantage due to high weight as described above. To accomplish this, the bumper of this invention is a composite element formed from plural structural members: an outboard structural member of deformation resistant material such as high strength steel and an inboard structural member of a light weight material such as aluminum alloy. These two structural members are joined together in a manner yielding the desired box-shaped cross section while preventing the establishment of galvanic action between the dissimilar materials of the structural members and consequential, intolerable corrosion of these materials.

SUMMARY OF THE INVENTION

A high strength motor vehicle bumper constructed in accordance with this invention includes a pair of structural members formed from dissimilar materials. Means join the structural members together into a composite bumper assembly while electrically insulating the dissimilar materials from one another to prevent galvanic action between the materials. In a first embodiment of the invention, said means comprises an adhesive layer located between the dissimilar materials. In a second embodiment of the invention, said means comprise metal fastener means joining the structural members and shielding means separating and electrically insulating said dissimilar materials from said fastener means and from each other.

DETAILED DESCRIPTION OF THE INVENTION

Figure 1:
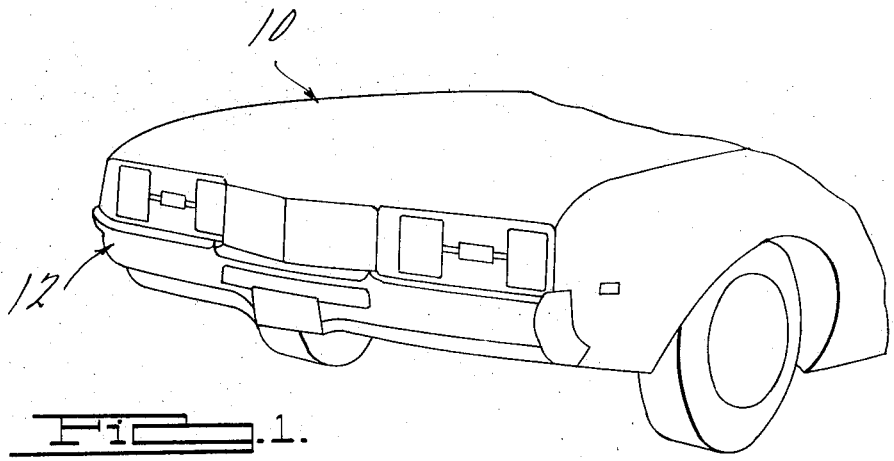
FIG. 1 is an isometric view of the front portion of a motor vehicle having a high strength bumper according to this invention.

Referring now in detail to the drawings, and in particular to FIG. 1, the numeral 10 denotes a motor vehicle having a front bumper 12 that is constructed in accordance with this invention. Front bumper 12, as will be seen below, is a high strength but relatively lightweight vehicle bumper suitably styled to be aesthetically pleasing as a portion of the overall vehicle design visible to an observer of the vehicle.

Figure 2:
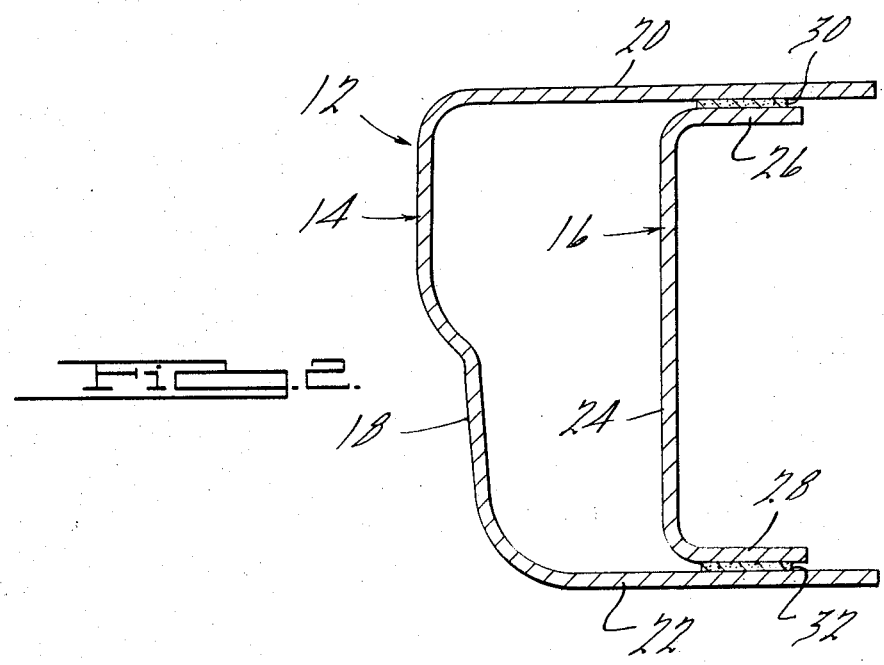
FIG. 2 is a cross sectional view taken through the bumper of the motor vehicle of FIG. 1.

As may be seen from FIG. 2, the vehicle bumper 12 is a composite assembly including a C-shaped outer member 14 of deformation resistant metal such as high strength steel having a vertical portion 18 and substantially horizontal, spaced apart arms 20 and 22. Bumper 12 also includes a C-shaped inner member 16 of relatively lightweight material such as aluminum alloy having a substantially vertical portion 24 and substantially horizontal, spaced apart arms 26 and 28. Members 14 and 16 are sized so that inner member 16 can be received between the horizontal arms 20 and 22 of outer member 14 with the upper arms 20 and 26 of members 14 and 16 respectively being spaced apart slightly and the lower arms 22 and 28 of members 14 and 16 respectively also being spaced apart slightly.

Outer member 14 and inner member 16 are joined together by means of adhesive layers 30 and 32. Adhesive layer 30 is between and joins upper horizontal arms 20 and 26, while adhesive layer 32 is positioned between and joins lower arms 22 and 28. It has been found that suitable material that can be used to join members 14 and 16 are a group of commercial adhesives sold under the generic names of vinyl, urethane and epoxy cements.

As readily may be appreciated, composite bumper 12 is formed so that a generally box-shaped cross section is formed by the two joined, C-shaped members 14 and 16. As is well known in the art, such a box-shaped cross section is capable of withstanding relatively large impact forces without suffering damage. Since the outboard member 14 is formed from a deformation resisted material such as high strength steel, the damage commonly incurred by vehicle bumpers due to minor collisions and impingement by stones or other small objects is eliminated or greatly reduced. Inboard member 14, formed from a lightweight material such as aluminum alloy that is relatively easily formed, is shielded from impact by the member 14. The aluminum alloy is, of course, relatively light in weight compared to steel. This fact greatly reduces the overall weight of the bumper 12 compared to a similar bumper constructed entirely of steel.

As is well known, an interface between dissimilar metallic materials such as steel and an aluminum alloy, when subjected to moisture and salt as is encountered under ordinary climate conditions, has the potential for the establishment galvanic cell with consequential metal corrosion due to the galvanic action. Establishment of a galvanic cell between the dissimilar materials of composite bumper 12 is prevented because the dissimilar materials are not in contact, being separated by adhesive layers 30 and 32. In addition, the adhesive material is an electrical insulator effectively insulating the steel of member 14 and the aluminum alloy member 16 against the electrical connection necessary for a galvanic cell to exist.

Figure 3:
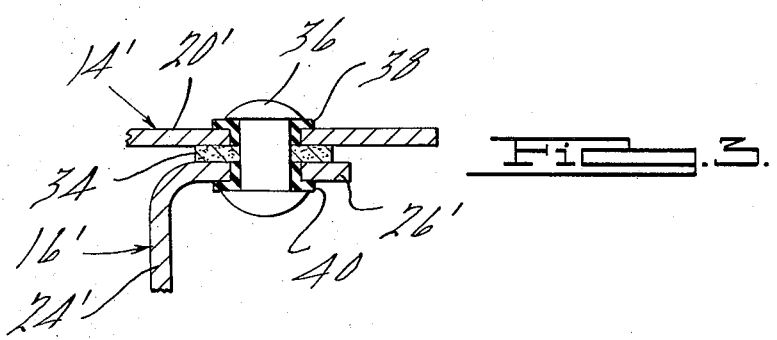
FIG. 3 is a partial sectional view illustrating an alternative method of joining the plural elements of the bumper of FIG. 2.

In FIG. 3, wherein parts like those illustrated in FIG. 2 are identified by similar but primed reference numerals, an alternative method of interconnecting the two members of composite bumper 12 is illustrated. In FIG. 3, upper arm 20' of outer member 14' and upper arm 26' of inner member 16' also are connected by means preventing the establishment of galvanic cell between the steel of member 14' and the aluminum alloy member 16'. These means include a washer 34 formed from electrical insulating material that separates the dissimilar materials. A rivet 36 extends through the central opening of washer 34 and joins arms 20' and 26' together. Contact between the upper portion of rivet 36 and are 20' is prevented by a collar 38 formed from electrical insulating material and that surrounds the upper part of the rivet shaft and is positioned between the upper head of the rivet and arm 20'. In like manner, a lower collar 40 electrically insulates and separates the lower portion of the rivet 36 from the lower arm 26'.

It may be appreciated that this invention provides a high strength, impact deformation resistant vehicle bumper assembly constructed of structural members formed from dissimilar materials and having a box-shaped cross section. The weight of this bumper assembly is substantially lower than a similar bumper made entirely of steel. Also, corrosion of the dissimilar materials of the composite bumper due to galvanic action is prevented by the individial members of the bumper being joined by means having the functions both to join and to electrically insulate the dissimilar materials.

We claim:

1. A high strength vehicle bumper of the type having a generally rectangular cross section and adapted to be secured by suitable mounting means to the exterior of a motor vehicle, said bumper including a first structural member formed from a first metal material and having a generally vertically extending portion and a pair of spaced apart arms extending from said portion, a second structural member formed from a second metal material and positioned between the arms of said first member, said first and second members cooperating to define a closed chamber within said bumper, and means joining said members together into a composite assembly while electrically insulating said first and second materials from one another.

2. The motor vehicle bumper of claim 1, wherein said means comprises an adhesive layer located between said dissimilar materials.

3. The motor vehicle bumper of claim 1 wherein said means comprise metal fastener means joining said structural members and shielding means separating and electrically insulating said materials from said fastener means and from each other.

4. The motor vehicle bumper of claim 1, wherein said means comprise an insulating pad positioned between said materials and said structural members in a spaced apart contiguous position, fastener means passing through said structural members and maintaining said structural members in said positions, and insulating shielding means positioned between said fastener means and said materials.

5. The bumper of claim 1 wherein said bumper is adapted to be secured to said vehicle with said first member positioned exteriorly of said second member, said first material having a higher resistance to deformation than said second material.

6. The bumper of claim 5 wherein said first material has a higher specific gravity than said second material.

* * * * *